United States Patent [19]
Peet, II

[11] Patent Number: 5,001,929
[45] Date of Patent: Mar. 26, 1991

[54] ELECTRONIC ALTIMETER

[75] Inventor: William J. Peet, II, West Allenhurst, N.J.

[73] Assignee: Peet Bros. Company, Inc., West Allenhurst, N.J.

[21] Appl. No.: 526,553

[22] Filed: May 21, 1990

Related U.S. Application Data

[63] Continuation-in-part of Ser. No. 398,766, Aug. 25, 1989, Pat. No. 4,969,358.

[51] Int. Cl.$^5$ .......................... G01C 21/00; G01L 9/00
[52] U.S. Cl. ........................................ 73/384; 340/977
[58] Field of Search ............ 73/384, 386, 387, 178 R, 73/178 H, 178 T, 4 R; 116/DIG. 43; 340/977

[56] References Cited

U.S. PATENT DOCUMENTS 3,180,152  4/1965  Metzger et al. .................... 73/384
3,726,138  4/1973  Kosakowski et al. ............ 73/384
4,355,294  10/1982  Ben-David et al. ............. 340/977

Primary Examiner—Donald O. Woodiel
Attorney, Agent, or Firm—Robert M. Skolnik

[57] ABSTRACT

An altimeter instrument is provided with display means which is locked or unlocked as a function of the output of a sensor which indicates whether the instrument or the apparatus whose altitude the instrument is sensing is in motion or about to be placed in motion or is stationary for a more than a predetermined period of time.

10 Claims, 1 Drawing Sheet

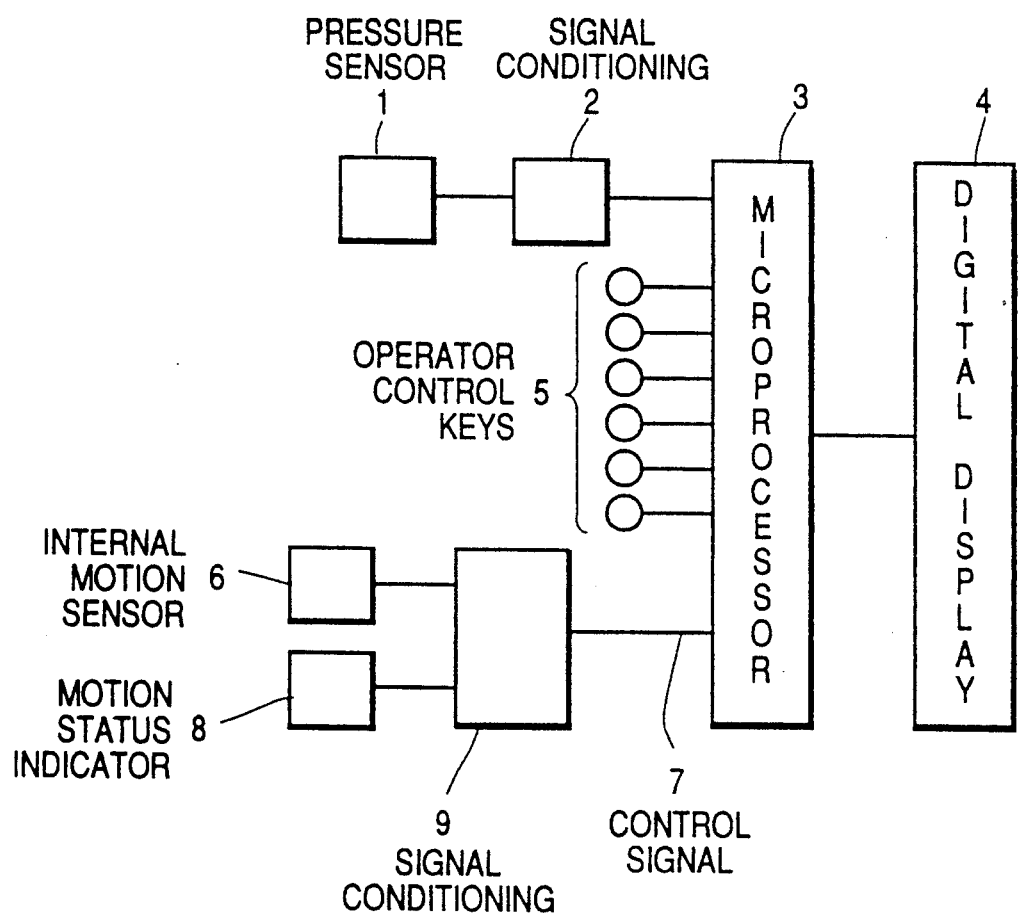

ELECTRONIC ALTIMETER

CROSS-REFERENCE TO RELATED APPLICATIONS

This application is a continuation-in-part of my copending application Ser. No. 07/398,766, filed Aug. 25, 1989, entitled ELECTRONIC ALTIMETER/BAROMETER, now U.S. Pat. No. 4,969,358, commonly assigned.

FIELD OF THE INVENTION

My copending application Ser. No. 07/398,766, filed Aug. 25, 1989, discloses and claims an invention relating related to electronic aneroid altimeter/barometer instruments that can display both altitude and sea-level pressure. Such instruments can be calibrated according to known altitude or known sea-level pressure. However, after such calibration, the instruments do not differentiate between weather related changes in pressure and those caused by changes in altitude. That application disclosed an internal motion sensor that caused the altitude indication to "lock" when the instrument was stationary and the sea level barometric pressure reading to "lock" while the instrument was in motion.

The present invention modifies the instruments described in my copending application insofar that a display of barometric pressure may or may not be provided. Additionally, the "locking" and "unlocking" of reading may be initiated by signals from either or both an internal motion sensor as described in my copending application and a "motion status indicator" that may be external to the instrument and may be of a different nature than said internal motion sensor.

DESCRIPTION OF THE PRIOR ART

As set forth in my copending application, a mechanical aneroid barometer is an instrument that senses atmospheric pressure impressed upon it, known as absolute pressure. Some such instruments for scientific use directly display absolute pressure. More commonly, absolute barometric pressure is translated into sea level pressure, which is the atmospheric pressure that would prevail at sea-level, given the same weather conditions. In order to display sea-level pressure, an aneroid barometer must be calibrated for the exact altitude at which it will be used. This is a semi-permanent mechanical adjustment typically accomplished by an adjusting screw. Inasmuch as the inter-relationship of altitude, sea-level pressure and absolute pressure is known, some aneroid barometers provide altitude calibration marks for the adjusting screw. Said calibration marks permit calibration to be made by setting in the known altitude if the exact sea-level pressure is not known. After being calibrated for its location, a mechanical aneroid barometer can continuously sense changes in absolute pressure at that location and display them as changes in sea-level pressure.

Likewise, an aneroid altimeter is an instrument that senses atmospheric pressure impressed upon it. However aneroid altimeters interpret changes in absolute pressure as changes in altitude. In order to display altitude accurately, such instruments must periodically be calibrated for existing weather conditions. This is accomplished by adjusting the altitude reading at places of known elevation. Some aneroid altimeters, especially those used in aircraft, provide an adjustment means calibrated in units of pressure, such that the altimeter can be calibrated by setting in a known sea-level pressure reading.

An orometer is a mechanical aneroid instrument having both a pressure scale and an altitude scale upon which needle position and movement can be read, thereby combining certain functions of an aneroid barometer and an aneroid altimeter. Although orometers have been known for many years, existing instruments still compromise the utility of the individual instruments they combine. For example, existing orometers do not provide direct reading of sea-level pressure at the needle position. One must first correct the altitude reading, then read sea-level pressure at the zero altitude graduation mark.

In recent years, comparable electronic instruments have been designed that more fully combine the capabilities of an aneroid barometer and an aneroid altimeter. Such electronic altimeter/barometers can directly display absolute pressure, sea-level pressure and altitude. However, like their mechanical predecessors, these instruments are limited by not being able to discern whether a given change in absolute pressure resulted from a change in altitude or a change in weather conditions. Consequently, erroneous values are displayed under various circumstances, leading to operator confusion and dissatisfaction. For example, the altitude reading of a stationary instrument may vary up and down many hundreds of feet as high and low pressure systems move through the region. A hiker, having adjusted the sea level pressure of his instrument, may find that setting changed by 0.5 inches of mercury after he hikes up or down a 500 foot hill.

Electronic versions of such instruments typically include an altitude display (in units of feet or meters) and a sea-level pressure or "barometer reading" display (in units such as millibars, in.Hg., etc.). Both of these displays are responsive to the absolute atmospheric pressure exerted on the instrument. The instrument typically includes provisions for setting so that when the instrument is placed in service, these displays can be adjusted to the correct values, i.e., to reflect the known altitude above sea level at the instrument location and also to reflect the proper value of sea-level pressure. After setting however, the instrument does not differentiate between changes in absolute atmospheric pressure caused by changes in weather conditions and changes in atmospheric pressure caused by movement of the instrument to a different altitude. Thus, as the absolute atmospheric pressure on the instrument changes for any reason, the altitude and the sea-level pressure values displayed by the instrument both change.

Re. U.S. Pat. No. 26,696 to Daleo discloses an aircraft altimeter which senses a reference pressure by a means other than the altimeter and sets it into the altimeter. In one example, the local airport barometric pressure is set into the altimeter. In another example, a standard value is used. In still another case, dual altimeter settings are provided with standard surface pressure and the non-standard reference pressure. The reference pressure is set as a baseline about which the barometric pressure is measured and displayed.

U.S. Pat. No. 3,747,409 to Argentieri discloses an aircraft altimeter employing a display construction employing indicia bearing metallic tape.

U.S. Pat. No. 4,133,409 to Holtam, et al. relates to an aircraft altimeter where ambient pressure is set into the apparatus.

U.S. Pat. No. 3,180,152 to Metzger, et al. discloses an altimeter where pressure compensation is required to avoid erroneous altitude readings caused by weather system changes.

U.S. Pat. No. 3,726,138 to Kosakowski, et al. shows a pressure transducer generating pressure and altitude signals and converted in a digital processor.

In accordance with the invention of my aforementioned copending application, two distinct operating modes are provided, a barometer mode and an altimeter mode. In addition, in the preferred embodiment, an automatic mode is provided in which the instrument functions in an altimeter mode when motion is sensed and in a barometer after no motion has been sensed within a set period of time. Barometer mode would be selected when the instrument is to remain in one location for a period of time and be used to observe changes in sea-level pressure. In barometer mode, the altitude display is uneffected by changes in absolute pressure. Instead, it is held constant at one of three values: its value when barometer mode was selected; the value calculated after known sea-level pressure is entered; or the value to which the operator adjusts it. Said fixed altitude display is distinguished as by flashing on and off or by concurrent display of an identifying label.

Altimeter mode would be selected when the instrument is to be moved about and be used to observe changes in altitude. In altimeter mode, the sea-level pressure display is uneffected by changes in absolute pressure. Instead it is held constant at one of three values: its value when the altimeter mode was selected; the value calculated after known altitude is entered; or the value to which the operator adjusts it. Said fixed sea-level display is distinguished as by flashing on and off or by concurrent display of an identifying label.

Automatic mode would be selected when altimeter mode would otherwise be selected and when movement of the instrument from place to place would be such as to activate the motion sensor.

A mode selection means is provided to select in which of said modes the instrument shall function. The existing mode is suitably displayed to the operator.

SUMMARY OF THE INVENTION

In some circumstances an altimeter may be transported in such a way that an internal motions sensor of the type described in my copending application might not reliably sense the motion. One example would be an altimeter mounted on a bicycle traveling on smooth pavement. Another example would be an altimeter mounted in an automobile under the same circumstance. The teachings of my copending application may be applied in such situations by using a different form of sensor or circuit, herein called a motion status indicator, to provide the altimeter a control signal indicative of motion or the likelihood of motion. Said control signal causes the altitude reading to be "unlocked" during periods of motion or likely motion and "locked" otherwise. Such motion status indicator may be employed in place of an internal motion sensor of the type described in my copending application or it may be employed in addition to such an internal sensor.

Some altimeters may omit calculation and display of sea level barometric pressure, for reasons of economy, ease of use, or such. The teachings of my copending application may be applied in such instruments by "locking" and "unlocking" the altitude reading according to a control signal either from an internal motion sensor as taught in said application, or from a motion status indicator according to this application.

A principal object of my invention is the provision of an altimeter in which the instrument's altitude indication is locked and precluded from responding to weather induced or diurnal changes in pressure so long as the instrument is not being transported.

Another object of my invention is the provision of an altimeter that can, in response to a control signal from an internal motion sensor, "unlock" the altitude indication when motion of the instrument is detected and for a period of time thereafter.

Another object of my invention is the provision of an altimeter or altimeter/barometer that can, in response to an appropriately derived control signal, "unlock" the altitude indication and "lock" the seal level barometric pressure indication (if such is provided).

Another object of my invention is the provision of an altimeter or altimeter/barometer that can respond to control signals from an internal motion sensor as well as from an appropriate external circuit or sensor. In particular, provision of such an instrument that responds to the presence of such signals by "unlocking" a normally "locked" altitude indication and "locking" an normally "unlocked" sea level barometric pressure indication, if such is provided.

BRIEF DESCRIPTION OF THE DRAWINGS

These as well as further objects and advantages of the invention will become apparent to those skilled in the art from a review of the following detailed specification of my invention reference being made to the accompanying drawings in which:

The FIGURE is a block diagram of the circuit employing my invention.

DETAILED DESCRIPTION OF THE INVENTION

The FIGURE is a block diagram of the circuitry employed to implement my invention. More particularly, an electronic altimeter instrument of the type described above or of the types described in my aforementioned copending application Ser. No. 07/398,766, filed Aug. 25, 1989 incorporates a microprocessor 3 having its output connected to display 4. The microprocessor 3 receives as inputs operator control keys 5, and a signal derived from a pressure sensor 1 (via signal conditioning circuitry 2) indicative of absolute barometric pressure level. A further input to microprocessor 3 is a motion sensing and control signal 7 indicative of motion or anticipated motion of the instrument. Motion sensing and control signal 7 is derived (via signal conditioning circuitry 9) from either or both an internal motion sensor 6 as described in the copending application and a motion status indicator 8 as described herein.

In the preferred embodiment of my invention, motion status indicator 8 is a sensor that is already in place for other purposes. An example would be the speedometer sensor in an automobile. Equally, motion status indicator 8 may be a sensor or switch required for other functions to be performed within the same altimeter instrument. For example, in a combined altimeter and bicycle computer, a reed switch employed to detect each rotation of the bicycle wheel could serve as motion status indicator 8. Of course, other modifications would be required to accomplish locking and unlocking of the altitude indication.

In some instances, the altimeter design might use a motion status indicator that, although not actually a motion sensor, would serve to indicate anticipated motion. For example, a vehicle's ignition switch could be used as a motion status indicator; when switched ON it indicates anticipated movement of the vehicle. Another exampled of a motion status indicator indicative of anticipated movement would be an internal electrical switch, activated when the instrument is clipped onto a user's belt or when it is hanging from a neck lanyard. In such a design, the motion status indicator would normally be provided in lieu of an internal motion sensor.

The invention simply requires that the altimeter normally be "locked" and "unlocked" only so long as motion is detected or anticipated. After motion sensing and control signal 7 has indicated no motion (or no anticipation of motion) for a set period of time, microprocessor 3 will cause the instrument to lock and retain for display the most recent altitude value. This fixed altitude display may be distinguished, if desired, by flashing on and off or by concurrent display of an identifying label or by blanking the display.

The arrangement provides for easy use by unskilled individuals and tends to minimize fallacious readings that confuse and dissatisfy users.

The microprocessor 3 may be programmed in accordance with the skill in the art to respond to the pressure sensor 1, the keyboard 5 and motion sensing and control signal 7 to perform the functions required in accordance with my invention. Likewise, any necessary signal conditioning circuitry is within the skill in the art.

It will be apparent that modifications may be made by employing different components, incorporating this altimeter circuitry within other instruments, utilizing different motion status indicators or different motion sensors; accordingly, what is sought to be protected is set forth in the appended claims.

I claim:

1. An electronic apparatus comprising: means to sense atmospheric pressure impressed upon said apparatus; computing and display means connected to said sensing means for interpreting changes in said atmospheric pressure and displaying them as changes in altitude; adjustment means coupled to said computing and display means for adjusting said apparatus by entering known altitude; motion sensing means for generating a motion sensing and control signal connected to said computing means; and control means in said computing means for maintaining said altitude constant or allowing said altitude to vary in response to said motion sensing and control signal.

2. The electronic apparatus of claim 1 wherein said altitude is held constant if said motion sensing and control signal indicates no motion within a predetermined period of time.

3. An altimeter instrument comprising: display means for displaying altitude; setting means connected to said display means, said setting means having an altitude setting mode to set the instrument to a known altitude; and means for locking the display at an altitude reading if said altimeter is stationary for a predetermined period of time.

4. A method of operating an altimeter instrument comprising the steps of: displaying altitude; and locking the display at an altitude reading if said instrument is stationary and permitting said altitude reading to change if said instrument is moving.

5. The method of claim 4 further including the step of setting said display means to an altitude level representing a known altitude.

6. An electronic altimeter instrument comprising: display means for displaying altitude; and motion sensing means connected to said display means for generating an output signal indicative of motion for automatically locking and unlocking said display means as a function of the status of said control signal.

7. The instrument of claim 6 wherein said motion sensor includes means to sense bicycle wheel rotation.

8. The instrument of claim 6 wherein said motion sensor includes speedometer sensor means in an automobile.

9. The instrument of claim 6 further including means for generating an output signal indicative of anticipated motion.

10. An altimeter instrument comprising altitude display means and motion sensor means connected to said display means for locking and unlocking said display means if said instrument or the apparatus whose altitude the instrument is sensing is in motion or is stationary.

* * * * *